United States Patent
Topelberg

(10) Patent No.: US 6,836,259 B2
(45) Date of Patent: Dec. 28, 2004

(54) ELECTROOPTICAL DISPLAY WITH CHANGEABLE PICTURES

(75) Inventor: Rafael Topelberg, Ramat Gan (IL)

(73) Assignee: Visson IP, LLC, Dover, DE (US)

( * ) Notice: Subject to any disclaimer, the term of this patent is extended or adjusted under 35 U.S.C. 154(b) by 387 days.

(21) Appl. No.: 10/105,886

(22) Filed: Mar. 26, 2002

(65) Prior Publication Data

US 2003/0214471 A1 Nov. 20, 2003

(51) Int. Cl.⁷ .............................................. G09G 3/04
(52) U.S. Cl. ........................... 345/43; 345/44; 345/48
(58) Field of Search ........................... 345/30, 43, 44, 345/45, 50, 33, 1.1, 4, 5; 349/56, 58, 61

(56) References Cited

U.S. PATENT DOCUMENTS

| | | | |
|---|---|---|---|
| 3,531,676 A | | 9/1970 | Robinson |
| 3,571,647 A | | 3/1971 | Robinson |
| 3,703,657 A | * | 11/1972 | Shesser ...................... 313/519 |
| 3,930,719 A | | 1/1976 | Madrid et al. |
| 4,471,350 A | * | 9/1984 | Chow ........................... 345/43 |
| 5,041,326 A | | 8/1991 | Schroeder et al. |
| 5,557,295 A | * | 9/1996 | Miyashita et al. ............ 345/36 |
| 5,754,268 A | * | 5/1998 | Aihara et al. ................ 349/155 |
| 6,072,619 A | | 6/2000 | Kiryuschev et al. |
| 6,262,697 B1 | * | 7/2001 | Stephenson ................... 345/43 |
| 2003/0006693 A1 | | 1/2003 | Topelberg |

FOREIGN PATENT DOCUMENTS

| | | |
|---|---|---|
| FR | 2 224 780 | 10/1974 |
| WO | WO 97/48254 | 12/1997 |
| WO | WO 02/45464 A2 | 6/2002 |

* cited by examiner

Primary Examiner—Kent Chang
(74) Attorney, Agent, or Firm—Browdy & Neimark, P.L.L.C.

(57) ABSTRACT

An electrooptical display comprising an electrooptically active (EOA) element, a first electrode element having a pattern of separated electrodes, a second electrode element, and a picture element having a pattern of picture parts which may be transparent, translucent, re-emitting, refractive or reflective. The pattern of the separated electrodes matches the pattern of picture parts in a predetermined way; for example, they may coincide, be nested, or overlap each other. The electrode elements and the EOA element form a plurality of EOA zones. The patterned elements are changeable by detaching and attaching and thereby allow the display to show different images.

29 Claims, 5 Drawing Sheets

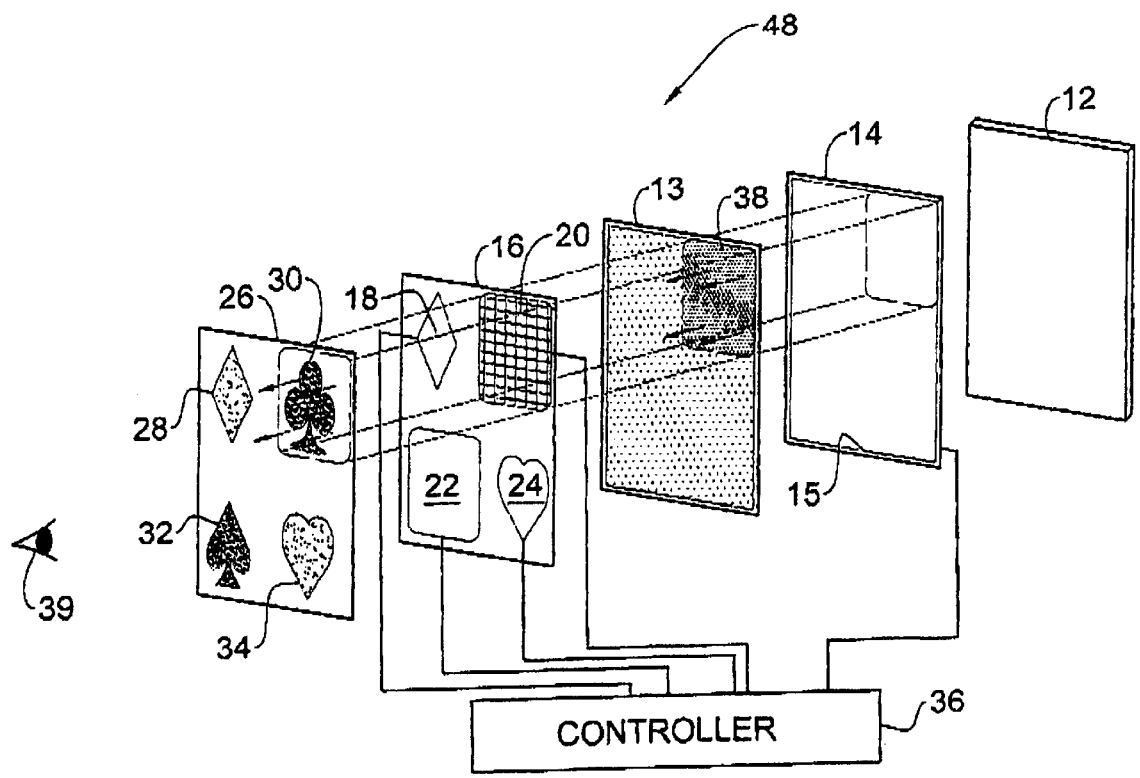
FIG. 2A
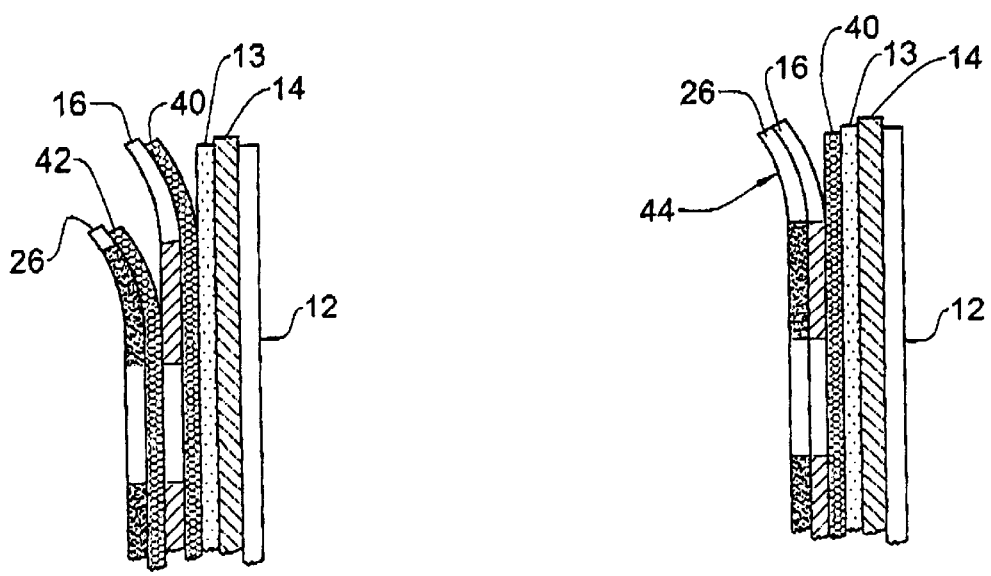
FIG. 2B
FIG. 2C

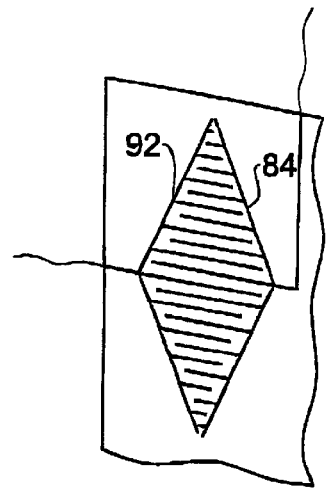
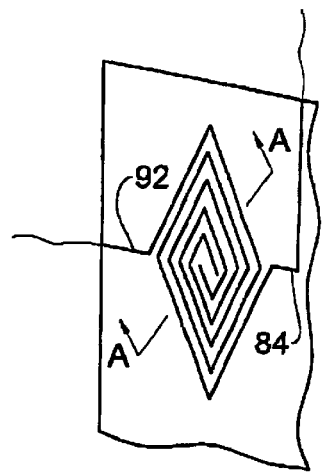
FIG. 7A          FIG. 7B
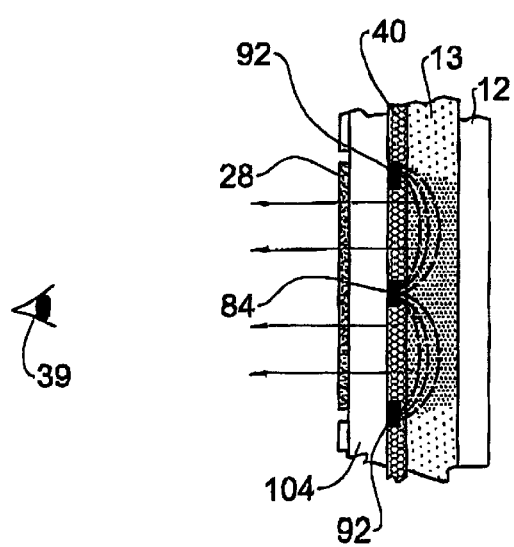
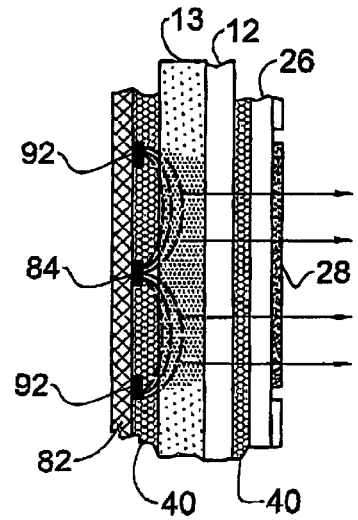
FIG. 8A          FIG. 8B

ELECTROOPTICAL DISPLAY WITH CHANGEABLE PICTURES

FIELD OF THE INVENTION

This invention relates to backlight panels, in particular to panels with changeable pictures.

BACKGROUND OF THE INVENTION

There are known electrooptic displays with static or semi-dynamic pictures or signs comprising a plurality of display elements and based on various electrooptically active (EOA) substances. Hereinafter, "EOA substance" is meant to denote any substance capable of changing its optic properties such as color, transparency, reflectivity, etc., or capable of emitting light, in response to changes of applied electric or electromagnetic field, and thereby suitable for displaying images.

For example, U.S. Pat. Nos. 3,531,676 and 3,571,647 disclose electroluminescent panels with one common grid electrode and a plurality of separated grid electrodes which may be in the form of bars, letters, or decorative designs. Those separated electrodes may be powered independently, by a suitable electronic driver, thereby producing light effects of display elements going on and off.

The electrodes may be made of transparent conductive materials such as indium tin oxide layer deposited on a polymer film, as disclosed in WO 97/48254.

The display elements of such electrooptic display may be numerous and may form quite complex pictures capable of presenting animated images or alpha-numeric characters, such as LCD of calculators or hand-held computer games.

These displays, however, are static in the sense that the individual pictures cannot be changed but only the display elements' optic effect can be controlled. Once manufactured, they can show permanently or periodically only one picture defined by the pattern of its display elements.

An ultimate solution to obtain dynamically changeable image is the matrix display where each picture element is formed of a plurality of pixels which may be controlled individually. However, these displays are very expensive. They have relatively low brightness due to the very process of pixel control (scanning) which limits the time during which a pixel can emit light.

SUMMARY OF THE INVENTION

In accordance with the present invention, there is provided an electrooptical display comprising two patterned elements: a picture element having a pattern of transparent translucent, re-emitting or reflective picture parts and a first electrode element having a pattern of separated electrodes. The pattern of separated electrodes matches the pattern of picture parts in a predetermined way. The display further comprises a carrying element, an electrooptically active (EOA) element and a second electrode element. Hereinafter, an EOA element is understood as a layer of EOA substance with or without a carrying substrate. The electrode elements and the EOA element form a plurality of EOA zones corresponding to the pattern of separated electrodes and define, together with the picture parts, a visible image. The patterned elements are detachably attachable, preferably by means of adhesive layers, and thereby allow the electrooptic display to display different images using the same carrying element and the same EOA element. The patterned elements may also consist of a plurality of parts that can be arranged and attached in various ways.

The patterned picture elements may be organized in changeable pairs with matching patterned electrode elements. Moreover, a picture element and an electrode element may be integrated in one changeable element. The electrode elements may be transparent or translucent, for example made of indium tin oxide, or may be formed as a network of thin metal strips deposited on a polymer substrate.

In accordance with one aspect of the invention, the electrode elements are disposed on different sides of the EOA element. The second electrode is a common electrode for all separated electrodes, whereby each of the separated electrodes defines an EOA zone including a portion of the EOA substance and a portion of the common electrode.

In accordance with another aspect of the invention, the first and the second electrode elements are both patterned and are disposed on one side of the EOA element, in the form of conductive paths running parallel to each other and free of contact with each other. The conductive paths preferably have the form of spirals or of combs inserted into each other. Both electrode elements and the picture element may be integrated in one changeable element. In this case EOA zones are formed in that part of the EOA element which is penetrated by the electric field formed by two adjacent conductive paths belonging to different electrodes.

The adhesive layers are preferably transparent and conductive. A conductive adhesive layer on the pattered electrode is laid in separated spots corresponding to the electrode pattern. Two adhesive layers intermediate to the changeable patterned element and one of the other elements may be used, where each adhesive layer is firmly attached to one element and the attaching and detaching takes place between the two adhesive layers.

To provide for better electrical contact between the electrode elements and the EOA element, one or more z-conductive layers may be disposed therebetween. A z-conductive layer is characterized by good conductivity across its thickness and zero or low conductivity parallel to the layer. Such material is described, for example, in WO/0036649 and WO98/57226. The z-conductive layers may also be transparent and/or adhesive.

The electrooptic display of the present invention provides for an efficient and cheap display device with versatile functions. The same EOA element and the same carrying element may be used to obtain various images with attractive optic effects. Pictures or parts thereof may be peeled off and attached as easy as wallpaper. All elements of such pictures may be individually controlled by a suitable electronic circuitry, such as digital controllers, computers, etc.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 2A is a schematic exploded view of another embodiment of the electrooptic display shown in FIG. 1A.

FIGS. 2B and 2C are alternative sectional views of the electrooptic display shown in FIG. 2A.

FIGS. 7A and 7B are partial views of the electrooptic display shown in FIG. 6.

FIGS. 8A and 8B are sectional views of the electrooptic display shown in FIG. 6.

DETAILED DESCRIPTION OF THE INVENTION

Figure 1B:
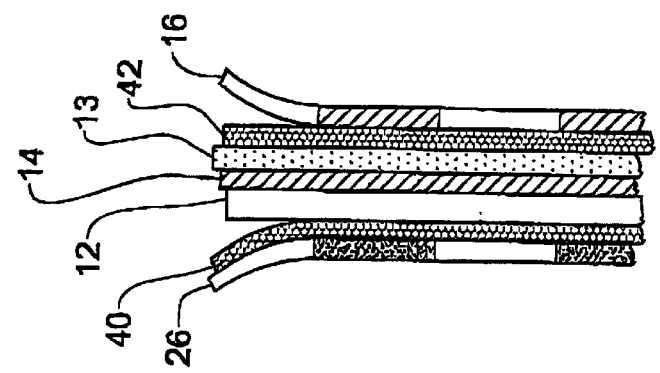
FIG. 1B is a sectional view of the electrooptic display shown in FIG. 1A.
Figure 1A:
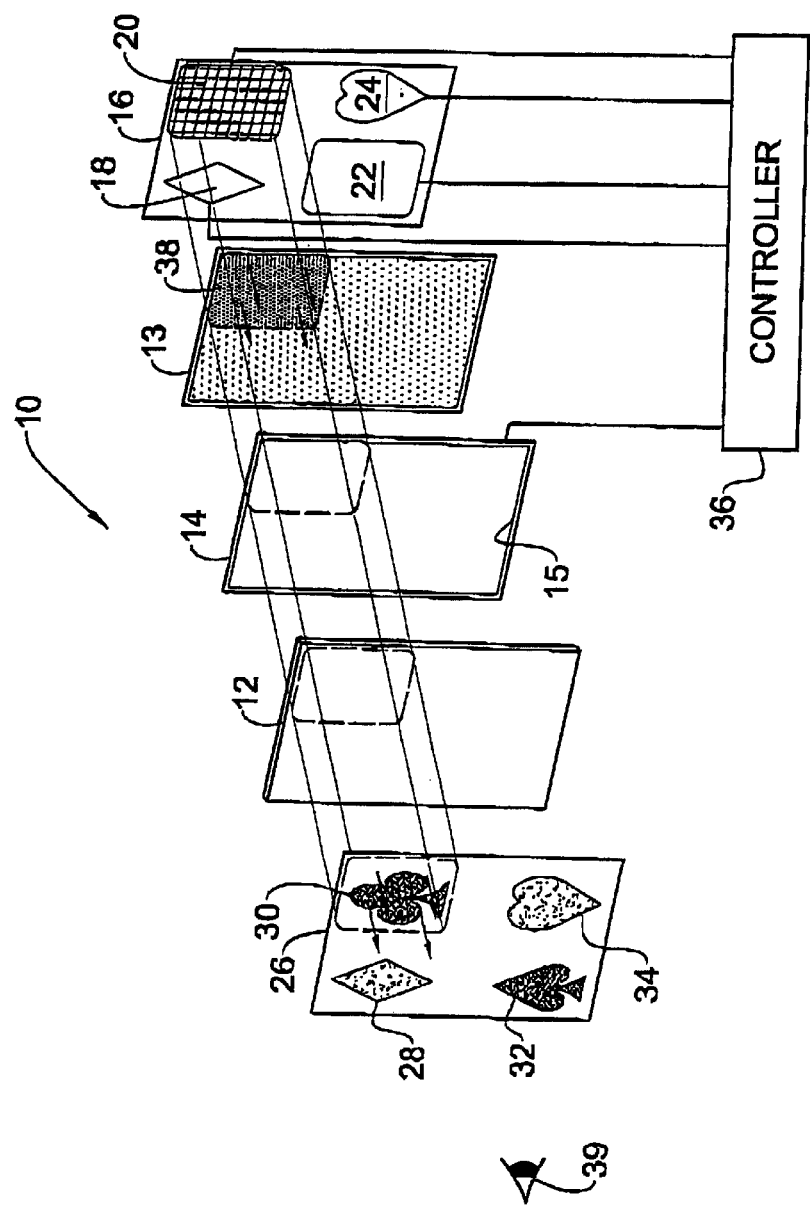
FIG. 1A is a schematic exploded view of a basic electrooptic display in accordance with one aspect of the invention.

With reference to FIG. 1A, it is shown, in an exploded schematic view, an electrooptic display 10 with changeable pictures, according to the present invention. The display 10 comprises a transparent carrying element 12, an electrooptically active (EOA) element 13, a front transparent electrode element 14 with a common electrode 15, a back flexible patterned electrode element 16 with separated electrodes 18, 20, 22 and 24, and a flexible patterned picture element 26 with picture parts 28, 30, 32 and 34. The EOA element 13 may be a layer of EOA substance on a suitable substrate such as a thin mesh or polymer film or just a layer laid on the electrode element 14. The common electrode 15 and the separated electrodes 18, 20, 22 and 24 are connected to a driver or controller 36. When the display is assembled, the EOA element 13 is sandwiched between the electrode elements 14 and 16 forming EOA zones, such as zone 38, between each of the separated electrodes 18, 20, 22 and 24, and the common electrode 15. The picture parts 28, 30, 32 and 34 on the picture element 26 match the separated electrodes 18, 20, 22 and 24 on the front electrode element 16 in a desired manner, for example they may coincide, be nested, overlap each other, etc. The picture parts may have different optical properties, e.g. different color, transparency, etc. The carrying element 12 may be flat, cylindrical or shaped otherwise in a manner suitable for covering and adhesion of flexible patterned elements, such as the electrode element 16 and the picture element 26. The carrying element may be integrated with the electrode element 14 and the EOA element 13. In particular, patterned pictures and electrodes may be assembled from separate thin flat fragments or may be extendable, for example to cover a spherical carrying element.

When a suitable electric signal is applied by the controller 36, e.g. to electrodes 20 and 15, the EOA zone 38 is activated, e.g. starts to emit light, and the picture part 30 becomes visible to the viewer 39 as a shining display element. A desired optical effect such as animation may be achieved by activating the EOA zones in a programmed sequence.

The electrooptic device described above may be connected to a computerized driver, for example for real-time control by an external input signal, to visualize current temperature, humidity, sound level, etc.

As shown in the sectional view of FIG. 1B, the patterned electrode element 16 and the patterned picture element 26 of the display 10 may be attached to the EOA element 13 and to the carrying element 12, respectively, by means of transparent adhesive layers 40 and 42. The adhesive is sensitive to pressure and allows peeling off and reattaching the patterned picture element 26 and the patterned electrode element 16. The electrooptical display may be supplied to users as a kit containing a plurality of matching changeable pairs 16-26, allowing an easy and rapid change of the displayed picture or animation. Each changeable pair may have its own programmed sequence loaded into the controller 36.

With reference to FIG. 2A, it is shown, in an exploded schematic view, a vacation of the electrooptic display of FIG. 1A, with somewhat different order of elements. The display 48 comprises a carrying element 12, an electrooptically active (EOA) element 13, a back electrode element 14 with a common electrode 15, a front transparent flexible patterned electrode element 16 with separated electrodes 18, 20, 22 and 24, and a flexible patterned picture element 26 with picture parts 28, 30, 32 and 34.

As shown in the sectional view of FIG. 2B, the patterned electrode element 16 and the patterned picture element 26 of the display 10 are attached to each other and to the EOA element 13 by means of the transparent adhesive layers 40 and 42. As shown in FIG. 2C, the patterned picture element 26 and the patterned electrode element 16 may be integrated in one changeable flexible film element 44, while the adhesive layer 40 may be firmly attached to the EOA element 13. Also, two touching adhesive layers may be used, one attached firmly to the EOA element, the other one attached to the changeable element.

To provide for better electrical contact between the patterned electrode element 16 and the EOA element 13, the adhesive layers 40 and 42 may be conductive. In this case, the adhesive layer 40, which is in contact with the patterned electrode element 16, is laid in separated spots matching the pattern of the separated electrodes.

A better electrical contact may be also provided by an adhesive layer made of z-conductive material which is characterized by good conductivity across its thickness and zero or low conductivity parallel to the layer. In this case, the adhesive layer on the patterned electrode element may be continuous.

Reverting to FIGS. 1A and 2A, picture parts, such as 28, 30, 32 and 34, may be printed on the front or on the back side of a carrying transparent film. The picture parts may be transparent or may be capable of re-emitting light, i.e. be printed in fluorescent dyes. The flexible transparent electrode element 16 may have an electrode pattern of conductive material such as indium-tin oxide (ITO) printed on a flexible transparent polymer film. Also, the picture element and the patterned electrode element may consist of respective parts adapted to be independently attached in different order. This option is illustrated in FIG. 4 with exchanged places of parts 28 and 34 and respective electrodes 18 and 24, but it is applicable to all embodiments.

Figure 3:
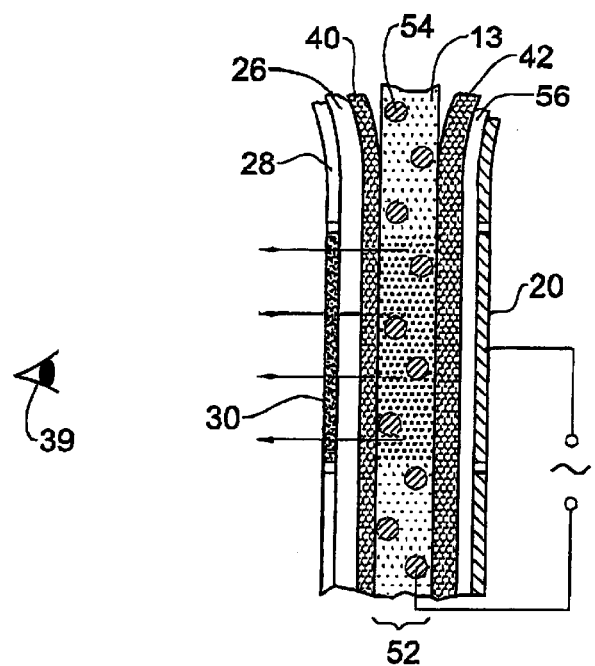
FIG. 3 is a sectional view of yet another embodiment of the electrooptic display shown in FIG. 1A.
Figure 4:
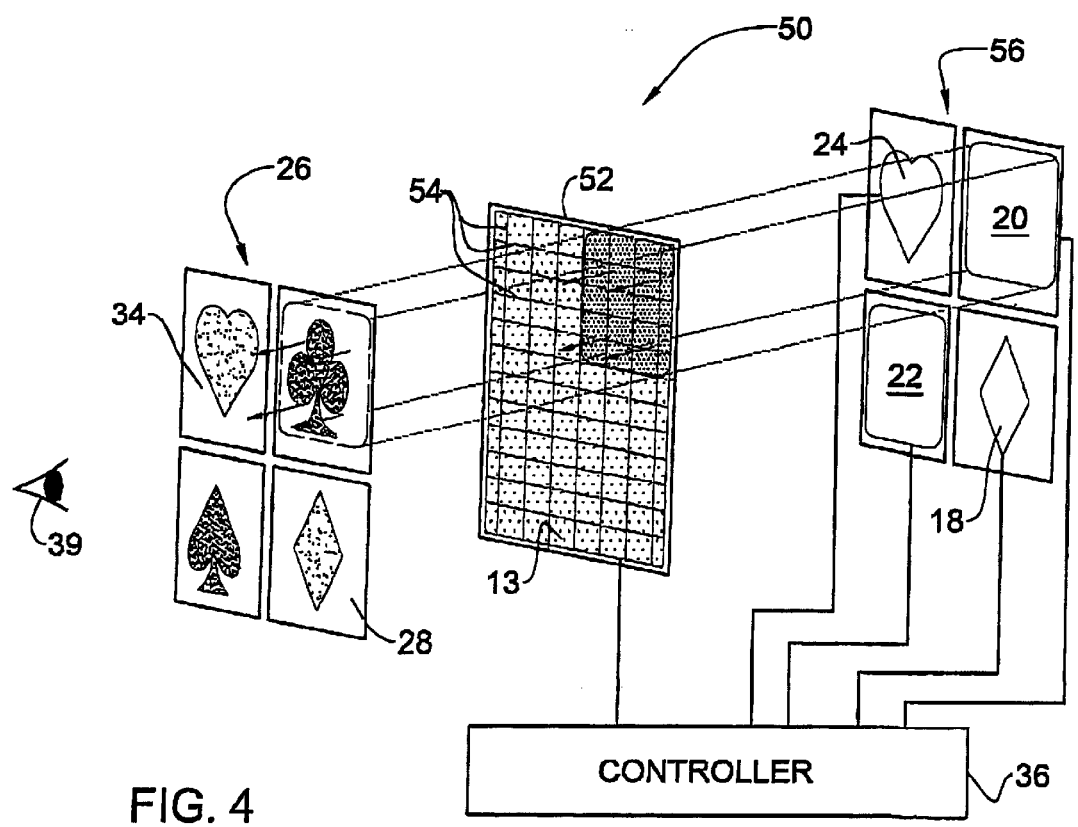
FIG. 4 is a schematic exploded view of the electrooptic display shown in FIG. 3.

According to another embodiment of the present invention shown as display 50 in FIG. 4, the carrying element, the second electrode and the EOA element are integrated in a flexible fabric 52. The fabric comprises a plurality of fibers and may be woven, non-woven or knitted. At least part of the fibers is conductive and they form a connected conductive network. As it is shown in the sectional view of FIG. 3, the fabric 52 constitutes a carrying element and is impregnated with EOA substance 13. Conductive fibers 54 constitute a second (common) electrode. A flexible patterned electrode 56 with separated electrodes 18, 20, 22, and 24 is detachably attached to the back of the fabric 52 by means of an insulating adhesive layer 42. A flexible picture element 26 with picture parts 28, 30, 32, and 34 is detachably attached to the front side of the fabric 52 by means of a transparent adhesive layer 40. EOA zones are formed in the vicinities of the conductive fibers 54 adjacent the separated electrodes. For example, FIGS. 3 and 4 show such zones excited by the electrode 20.

Figure 5:
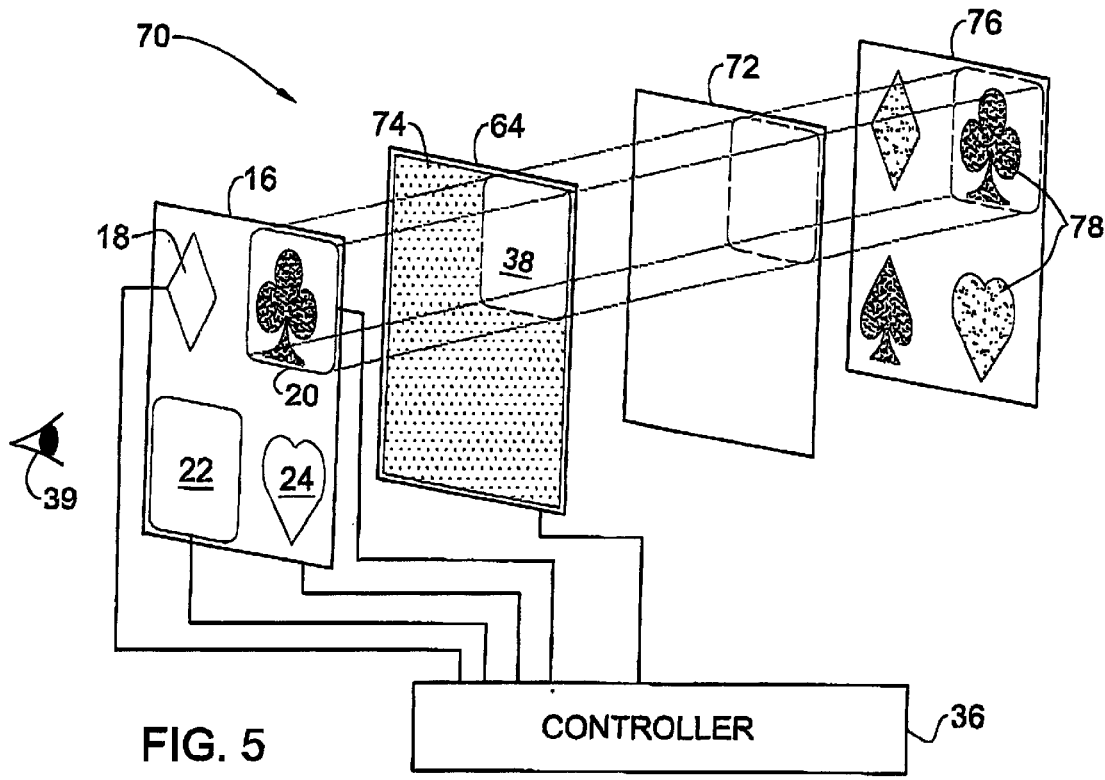
FIG. 5 is a schematic exploded view of a basic electrooptic display in accordance with a second aspect of the invention.

Still another embodiment of an electrooptic display with changeable pictures in accordance with the present invention is shown in the exploded view of FIG. 5. The designation of the elements in FIG. 5 is the same as in FIG. 1, where applicable. In FIG. 5, the display 70 comprises a transparent carrying element 72, a transparent back common, electrode 64 with EOA substance 74 which is of electro-modulating type, e.g. capable of changing its refractive index (transparency), for example, a liquid crystal. The display 70 further comprises a front transparent flexible patterned electrode element 16 with separated electrodes 18, 20, 22 and 24, and a flexible patterned picture element 76 at the back of the display, with picture parts 78 which reflect light thereby forming display elements. The common electrode 64 and the separated electrodes 18, 20, 22 and 24 are connected to the controller 36. When a suitable electric signal is applied by the controller 36, an EOA zone, for example 38, is activated, e.g. becomes transparent, and a display element becomes visible to the viewer 39 in reflected light. It should be understood that the common electrode 64, the carrying element 72, and the EOA element (substance) may be united in one element.

Figure 6:
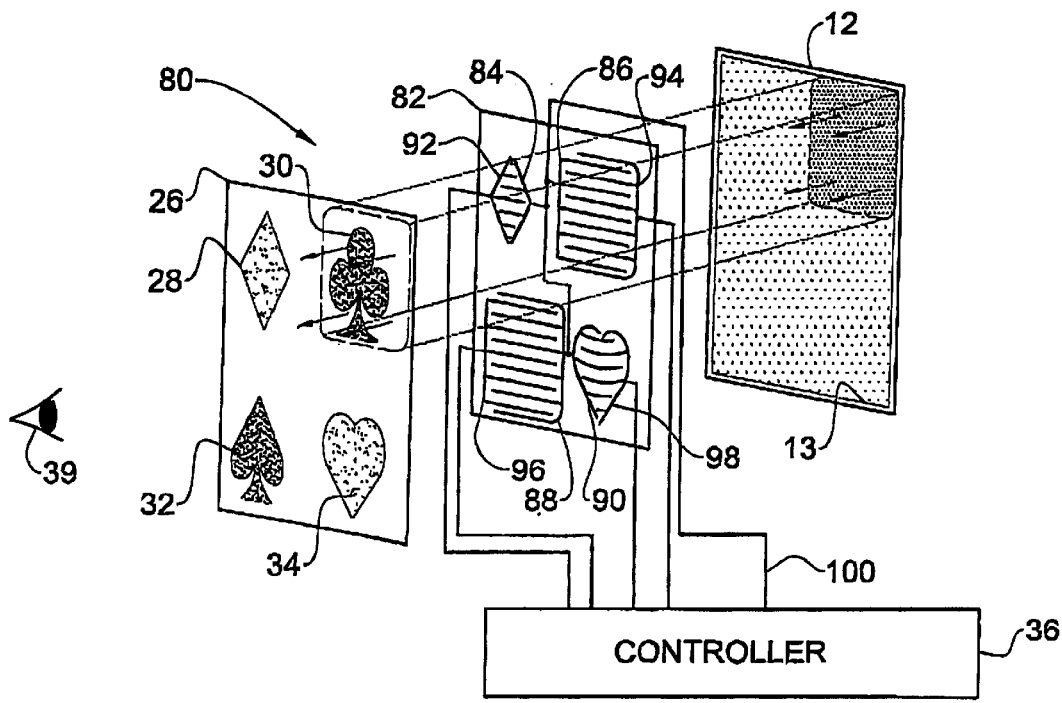
FIG. 6 is a schematic exploded view of a basic electrooptic display in accordance with a third aspect of the invention.

An electrooptic display 80 with changeable pictures in accordance with another aspect of the present invention is shown in the exploded view of FIG. 6. The display 80 comprises a carrying element 12 with EOA substance 13, a transparent front electrode element 82 having a first system of separated electrodes 84, 86, 88 and 90, and a second system of separated electrodes 92, 94, 96 and 98, the two systems being free of contact therebetween, and a flexible patterned picture element 26 with picture parts 28, 30, 32 and 34. The electrodes of the first system may be connected into a common electrode 100, and all electrodes are connected to the controller 36. As shown in detail in FIG. 7A, each electrode of the first system, e.g. 84, is complemented by an electrode of the second system, i.e. 92, to form a pattern matching a display element, e.g. 28 (FIG. 6) of the picture 26. While the electrodes in FIG. 7A are shaped like combs opposingly inserted into each others other configurations are possible, provided the electrodes of the first system are uniformly spaced from the electrodes of the second system. A possible spiral shape of the electrodes is shown in FIG. 7B.

When the display 80 is assembled, the EOA substance 13 remains at one side of the electrode element 82. In this case, EOA zones between the electrodes of the two systems are formed as shown in the enlarged sectional view of FIG. 8A taken along the lie A—A of FIG. 7B. The picture element and the electrode element are shown in FIG. 8A integrated in one changeable picture. The picture parts, e.g. 28 are printed on one side of a flexible transparent substrate 104, while electrodes, e.g. 84 and 92, are disposed on the other side of the substrate. An adhesive layer 40 is applied between the changeable picture and the EOA element 13. When a suitable electric signal is applied by the controller 36, for example between the electrodes 92 and 84, the electric field formed between them penetrates the EOA substance 13 and an EOA zone matching the picture part 28 is activated, e.g. starts to emit light, making it visible to the viewer 39 as a display element.

As shown in the sectional view of FIG. 8B, the picture element 26 and the electrode element 82 may be disposed at different sides of the carrying element 12. In this case the electrode element 82 may not be transparent.

Although a description of specific embodiments has been presented, it is contemplated that various changes could be made without deviating from the scope of the present invention. For example, the reflective display of FIG. 5 may be built with the electrode element of FIG. 6, or all combinations of adhesive and conductive layers described with reference to the embodiments of FIGS. 1A and 2A may be applied to the other embodiments.

What is claimed is:

1. An electrooptical display comprising two patterned elements: a picture element leaving a pattern of picture parts and a first electrode element having a pattern of separated electrodes, said pattern of separated electrodes matching said patterned of picture parts in a predetermined way, said display further comprising a carrying element an electrooptically active (EOA) element and a second electrode element, the electrode elements and said EOA element forming a plurality of EOA zones corresponding to the pattern of separated electrodes and defining, together with said picture parts, a visible image, wherein at least one of said patterned elements is replaceable by a differently patterned element and thereby allows said display to show different images.

2. An electrooptical display in accordance with claim 1, wherein said picture parts are one or more of the following transparent, translucent, re-emitting, refractive or reflective.

3. An electrooptical display in accordance with claim 1, wherein said replaceable element is detachably attachable to one of the other elements of said display.

4. An electrooptical display in accordance with claim 3, wherein said replaceable element is detachably attachable by means of at least one adhesive layer.

5. An electrooptical display in accordance with claim 1, wherein the pattern of said first electrode element coincides with the pattern of said picture element.

6. An electrooptical display in accordance with claim 1, equipped with a plurality of replaceable pairs of patterned elements, each pair comprising a patterned picture element and a matching patterned first electrode element.

7. An electrooptical display in accordance with claim 1, wherein said first electrode element and said picture element are integrated in one replaceable patterned element.

8. An electrooptical display in a accordance with claim 1, wherein said second electrode element and said EOA element are integrated in one element.

9. An electrooptical display in accordance with claim 1, wherein at least one of said first and second electrode elements is transparent or translucent.

10. An electrooptical display in accordance with claim 9, wherein said first and said second electrode elements are disposed on different sides of said EOA element, said second electrode element is a common electrode for the separated electrodes of the first electrode element, whereby said EOA zones are each defined by a portion of the EOA element between each separated electrode and a corresponding portion of said common electrode.

11. An electrooptical display in accordance with claim 9, wherein said picture element is disposed adjacent to the transparent or translucent electrode element.

12. An electrooptical display in accordance with claim 11, wherein said picture element is reflective.

13. An electrooptical display in accordance with claim 1, wherein at least one z-conductive layer is disposed between the carrying element and one of the electrode elements.

14. An electrooptical display in accordance with claim 13, wherein said z-conductive layer is transparent or translucent.

15. An electrooptical display in accordance with claim 13, wherein said z-conductive layer is adhesive.

16. An electrooptical display in accordance with claim 4, wherein said adhesive layer is transparent or translucent.

17. An electrooptical display in accordance with claim 4, wherein said adhesive layer is conductive.

18. An electrooptical display in accordance with claim 17, wherein said adhesive conductive layer is laid in a pattern of separated areas matching the pattern of separated electrodes.

19. An electrooptical display in accordance with claim 4, wherein said adhesive layer provides for multiple attaching and detaching of said replaceable element.

20. An electrooptical display in accordance with claim 19, wherein there are at least two adhesive layers, one attached to said replaceable element and one attached to one of the other elements of said display and said attaching and detaching takes place between said two adhesive layers.

21. An electrooptical display in accordance with claim 1, wherein said first and second electrode elements are connected to a driver device adapted to control individually said separated electrodes.

22. An electrooptical display in accordance with claim 1, wherein said second electrode element has a pattern of second separated electrodes and is integrated with said first electrode element, free of contact therebetween, in one common patterned replaceable electrode element attached at one side of the EOA element.

23. An electrooptical display in accordance with claim 22, wherein said common replaceable electrode element and the picture element are integrated in one replaceable element.

24. An electrooptical display in accordance with claim 22, wherein said first separated electrodes run parallel to said second separated electrodes.

25. An electrooptical display in accordance with claim 24, wherein said first and said second separated electrodes run in spiral paths.

26. An electrooptical display in accordance with claim 24, wherein said first and said second separated electrodes are formed in comb shapes opposingly inserted into each other.

27. An electrooptical display in accordance with claim 8, wherein said second electrode element, said EOA element, and said carrying element are integrated in one element.

28. An electrooptical display in accordance with claim 8, wherein said EOA element has a substrate of flexible fabric comprising a network of conductive fibers, said fibers constituting said second electrode element.

29. An electrooptical display in accordance with claim 1, wherein said replaceable elements consist of a plurality of parts that are independently detachably attachable to one of the other elements of said display.

* * * * *

UNITED STATES PATENT AND TRADEMARK OFFICE
CERTIFICATE OF CORRECTION

PATENT NO. : 6,836,259 B2
DATED : December 28, 2004
INVENTOR(S) : Rafael Topelberg It is certified that error appears in the above-identified patent and that said Letters Patent is hereby corrected as shown below:

Column 6,
Line 8, delete "leaving" and insert -- having --.
Line 11, delete "patterned" and insert -- pattern --.

Signed and Sealed this

Twentieth Day of December, 2005

JON W. DUDAS
*Director of the United States Patent and Trademark Office*